United States Patent [19]

Ichikawa

[11] Patent Number: 5,768,391
[45] Date of Patent: Jun. 16, 1998

[54] SYSTEM AND METHOD FOR ENSURING USER PRIVACY IN NETWORK COMMUNICATIONS

[75] Inventor: Bryan K. Ichikawa, Colorado Springs, Colo.

[73] Assignee: MCI Corporation, Washington, D.C.

[21] Appl. No.: 577,012

[22] Filed: Dec. 22, 1995

[51] Int. Cl.$^6$ ............................................. H04L 9/32
[52] U.S. Cl. ................................... 380/49; 380/25
[58] Field of Search .......................... 380/23, 25, 49

[56] References Cited

U.S. PATENT DOCUMENTS

| | | | |
|---|---|---|---|
| 4,418,425 | 11/1983 | Fennel, Jr. et al. | 380/48 |
| 5,245,656 | 9/1993 | Loeb et al. | 380/23 |
| 5,303,303 | 4/1994 | White | 380/49 |
| 5,386,470 | 1/1995 | Carter et al. | 380/48 |
| 5,442,702 | 8/1995 | van Ooijen et al. | |
| 5,444,782 | 8/1995 | Adams, Jr. et al. | 380/49 |
| 5,475,757 | 12/1995 | Kelly | 380/23 |
| 5,548,646 | 8/1996 | Aziz et al. | 380/23 |
| 5,548,649 | 8/1996 | Jacobsen | 380/49 |

FOREIGN PATENT DOCUMENTS 0 669 741 A2   8/1995   European Pat. Off. .

OTHER PUBLICATIONS

Sargent, III et al., "The IBM PC from the Inside Out," Addison–Wesley Publishing Co., Reading, Massachusetts, 1986, pp. 398–404.
Gemplus, Millions of Individual Cards, [Gemplus; Innovatron & Bull CP8 Patents; Oct. 3, 1995](Internet Access).
Prepaid Smart Card Techniques: A Brief Intro. & Comparison; [David Chaum; Scientific Publications; 1994 by DigiCash bv] (Internet Access).
SecureMail [SecureWare Inc.;] (Internet Access) Jan. 25, 1995.
Leapfrog in Smart Card Technology; [Cascade 1st Press Release; Mar. 1, 1994; Bruno Cucinelli] (Internet).
Welcome to Smart Cards [Gemplus] Oct. 25, 1995.
Untraceable E–Mail, Return Addresses, & Digital Psuedonyms; [David L. Chaum; Feb. 1981; vol. 24, No. 2] (Internet).

Primary Examiner—Salvatore Cangialosi

[57] ABSTRACT

A system and method for ensuring user privacy in a messaging system where a message is sent from a sender to a recipient via a service provider. Information pertaining to the identification of a sender and recipient of a message is encrypted so that a third party cannot determine who is sending the message to whom. Specifically, delivery information of the message is reformatted to indicate that the service provider is the recipient. The identification of the actual recipient is encrypted and sent along with the message to the service provider. Upon receipt, the service provider decrypts the actual recipient information to determine the identification of the actual recipient. The service provider reformats the delivery information to indicate that the actual recipient is the recipient of the message and that the service provider is the sender of the message. The identification of the actual sender is encrypted and sent along with the message to the actual recipient. The recipient receives the message from the service provider. The recipient may decrypt the encrypted identification of the actual sender to learn who sent the message. The message contents may optionally be encrypted as well to ensure message privacy as well as user privacy.

18 Claims, 6 Drawing Sheets

SYSTEM AND METHOD FOR ENSURING USER PRIVACY IN NETWORK COMMUNICATIONS

BACKGROUND OF THE INVENTION

1. Field of the Invention

This invention relates generally to electronic message systems, and more specifically to a system and method for ensuring user privacy for network communications.

2. Related Art

A vast array of electronic information infrastructures are rapidly being assembled and used by business and industry to facilitate the exchange of information and data across both near and far distances. As available computing power at a given price point is increasing, personal computers, workstations and other computing devices are finding their way onto more desktops, into more offices, and into more working environments than ever before imagined. These computing devices are used as the links into the information infrastructure, allowing all forms of electronic communications and data exchange.

This rise of electronic communication is a world-wide phenomenon, globally affecting all facets of business and industry. Be it a local area network linking a few computers together in close proximity, or a wide area network providing information exchange around the globe, more and more businesses and individuals are turning to communications and data exchange via this electronic infrastructure. The electronic information infrastructure is reaching business operations from manufacturing and production to research and development, sales and commerce.

With local area networks limited to internal communications within a business or working group, user privacy and information secrecy are not generally in great demand. However, for certain wide area and global networks, such as the Internet for example, user privacy and information secrecy are of heightened concern. One reason for this concern with these networks is that often times messages can be 'picked off' of the network and read by persons other than the intended recipient. Such snooping is of great concern to businesses and individuals who wish to maintain the contents of their messages confidential and who wish to maintain secrecy regarding the identity of the sender and recipient of a message.

SUMMARY OF THE INVENTION

The present invention is directed toward a system and method for ensuring user privacy in a messaging system where a message is sent from a sender to a recipient via a service provider. According to the invention, information pertaining to the identification of a sender and recipient of a message is obscured so that a third party cannot determine who is sending the message to whom. According to one embodiment of the invention, the identification of the sender and receiver is encrypted. Specifically, delivery information of the message is reformatted to indicate that the service provider is the recipient. The identification of the actual recipient is encrypted and sent along with the message to the service provider.

Upon receipt, the service provider decrypts the actual recipient information to determine the identification of the actual recipient. The service provider reformats the delivery information to indicate that the actual recipient is the recipient of the message and that the service provider is the sender of the message. The identification of the actual sender is encrypted and sent along with the message to the actual recipient.

The recipient receives the message from the service provider. The recipient may decrypt the encrypted identification of the actual sender to learn who sent the message.

The message contents may optionally be encrypted as well to ensure message privacy as well as user privacy.

An advantage of the invention is that messages can be sent among users across a communications network while maintaining privacy with regard to the identity of the end users. While a third party may, in some situations, be able to determine who is sending a message to or receiving a message from the service provider, the third party will not be able to determine the identities of both the sender and the recipient for a given message.

A further advantage of the invention is that it can be implemented in the user's terminal (PC, workstation or otherwise) and perform the encryption/decryption in a manner which is somewhat transparent to the user. Once the appropriate keys are set up or distributed, the end users can communicate with one another without having to perform additional steps to ensure their privacy.

Further features and advantages of the present invention, as well as the structure and operation of various embodiments of the present invention, are described in detail below with reference to the accompanying drawings.

BRIEF DESCRIPTION OF THE DRAWINGS

The present invention is described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE EMBODIMENTS

1. Overview and Discussion of the Invention

The present invention is directed toward system and method for ensuring user and message privacy in electronic information transfer. According to the invention, electronic messages can be sent over an open network while maintaining privacy with regard to who is sending the message to whom. According to the invention, when a message is sent across the network, it's header is reformatted. This reformatting involves the encryption of the sender and recipient identification so that a third party cannot snoop into their identities. The manner in which this is accomplished is described in detail below.

2. Example Environment

Before describing the invention in detail, it is useful to describe an example environment in which the invention can be implemented. In the broadest sense, the invention can be implemented in any network environment where it is likely that a third party may 'intercept' or snoop into a message sent by a sender to a recipient. One such environment is an open network, an example of which is the well know Internet network. The Internet is an open network that is comprised of a worldwide set of interconnected computer networks.

Figure 1:
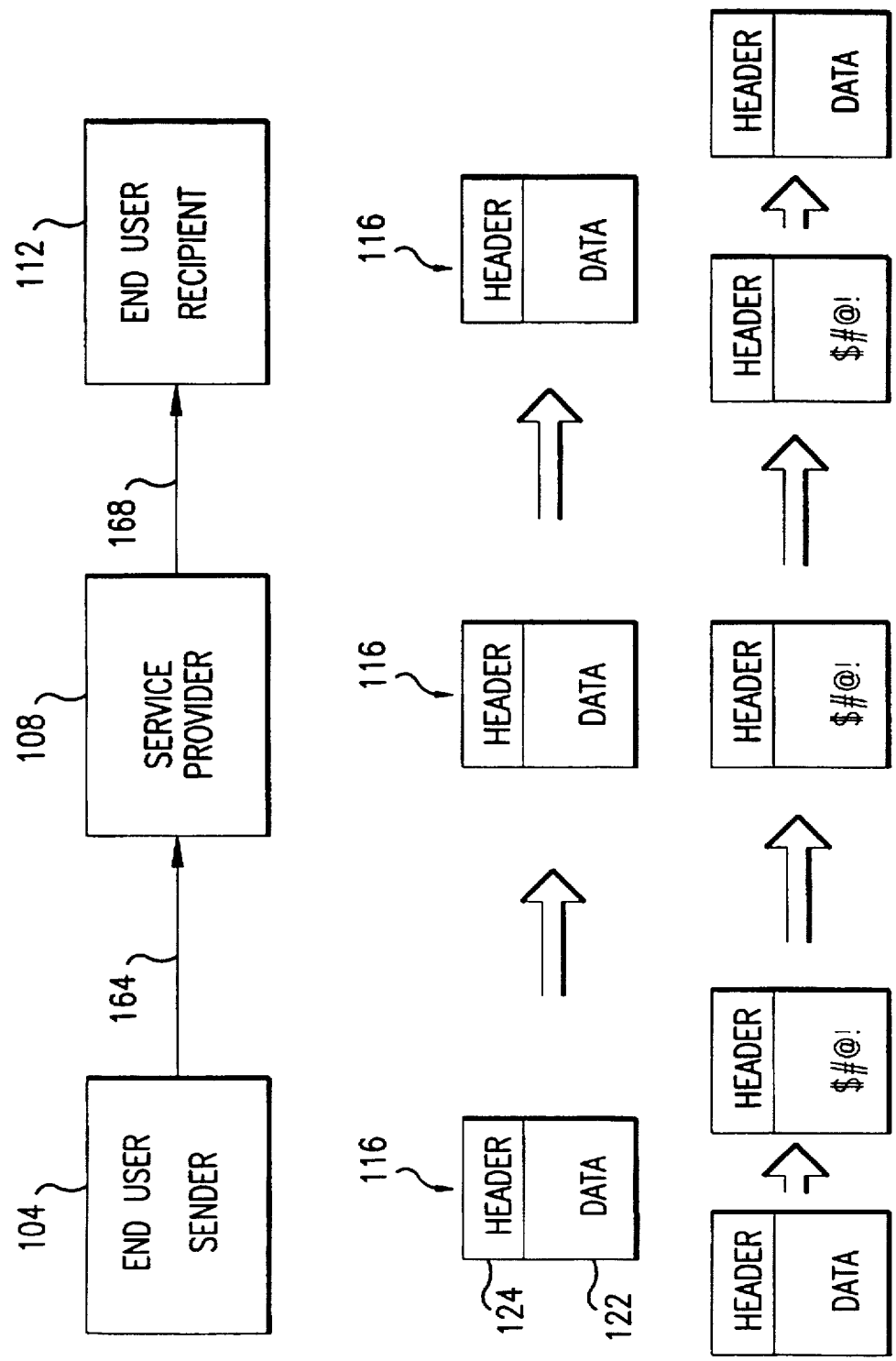
FIG. 1 is a block diagram illustrating an example environment in which the invention may be implemented.

FIG. 1 is a block diagram illustrating a subset of a network that forms the example environment described herein. Specifically, this subset includes end users 104, 112, a service provider 108 and links 164, 168 between the users 104,112 and service provider 108. To enable a discussion of this network in terms of an electronic messaging scenario, end users 104,112 are referred to as a sender 104 and a recipient 112. In an open network such as the Internet, there is often a service provider 108 who provides end users 104,112 with access to the open network. Examples of a service provider can include providers such as MCIMail, CompuServe, America On Line, and other like providers.

In an electronic messaging scenario, sender 104 generates a message 116 and sends message 116 to recipient 112. Message 116 includes message content, referred to as data 122, and a message header 124. Header 124 includes delivery information such as an identification of the sender and the recipient. Header 124 may also include other delivery or administrative information.

Although it may appear to the human sender that she is sending her message 116 directly to recipient 112, in actuality her message 116 is being sent to service provider 108. Service provider 108 is then responsible for interpreting header 124 information and forwarding message 116 via the network to recipient 112. The use of service providers and electronic mail messaging techniques are well known in various forms.

Where users 104,112 desire message privacy, they may code the message contents (i.e. the data 122, designated by reference characters "$#@!" in FIG. 1) so that third parties can not snoop into the contents of message 116. Such coding can be accomplished by well known techniques such as encryption. The encryption can be performed using public or private keying encryption techniques. Although FIG. 1 illustrates that data 122 are encrypted after they are included with header 122, the encryption can also be performed before the message is addressed.

The present invention is described in terms of this example network environment. Description in these terms is provided for convenience only. It is not intended that the invention be limited to application in this example environment. In fact, after reading the following description, it will become apparent to a person skilled in the relevant art how to implement the invention in alternative environments.

3. User Privacy

One disadvantage of conventional network messaging systems is that they do not allow for privacy in the identification of the sender 104 and recipient 112. A third party intercepting messages 116 on the network may easily identify the sender 104 and recipient 112 of such messages 116.

Figure 2:
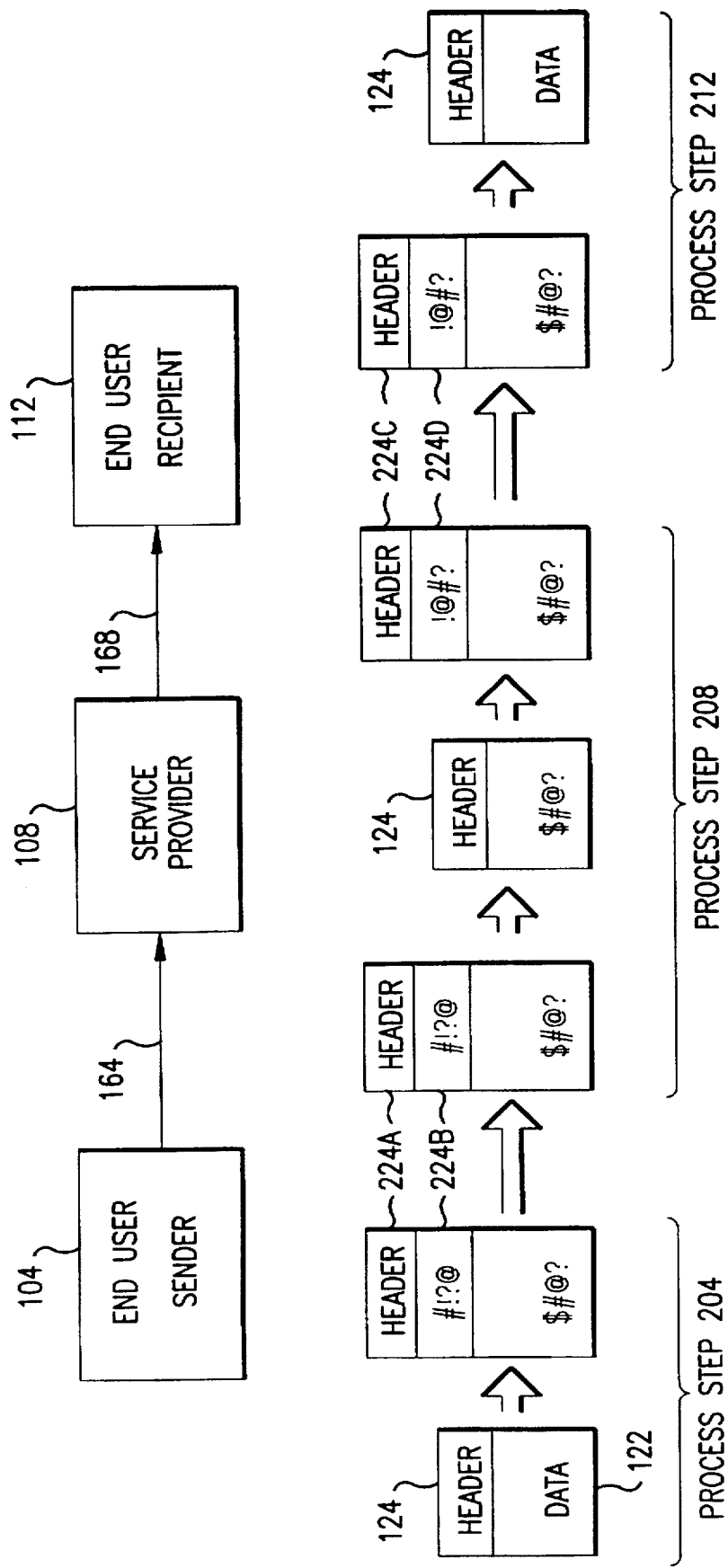
FIG. 2 is a diagram illustrating an end-to-end process according to one embodiment of the invention.

The present invention utilizes coding techniques to mask the identities of the sender 104 and recipient 112 during message delivery. FIG. 2 is a block diagram generally illustrating the process of the invention according to one embodiment. Referring now to FIG. 2, before a message 116 is sent for delivery across the network, the header portion of the message 116 is reformatted as illustrated by process step 204. The reformatted header includes a clear portion 224A and an encrypted portion 224B. Clear portion 224A of message 116 includes an identification of service provider 108 as a recipient. Encrypted portion 224B of message 116 includes an encrypted version of the recipient identification. Thus, when message 116 is sent to service provider 108, the identity of recipient 112 is unknown to snoopers. In one embodiment, this step 204 is accomplished as follows: The "TO" designation in the header is modified to reflect service provider 108 as the recipient of the message and the actual recipient's identification is encrypted and sent as part of message 116 to service provider 108.

Service provider 108 accepts the message, decrypts the encrypted recipient identification, encrypts the sender identification and sends the message to the recipient 112. As a result clear portion 224C includes an identification of recipient 112 and service provider 108 and encrypted portion 224D includes an identification of sender 104. This is illustrated by process step 208. In one embodiment, this step 208 is accomplished as follows: The "TO" designation in the header is modified to once again reflect recipient 112 as the recipient of the message; similarly, the "FROM" designation in the header is modified to reflect that service provider 108 is sending the message 116 to recipient 112; and the actual sender's identification (i.e. sender 104) is encrypted and sent as part of message 116 to recipient 112.

When recipient 112 receives message 116, recipient 112 decrypts the message and can now read the original header 124 and data 122. This is illustrated by process step 212. Note that the process illustrated in FIG. 2 includes the step of encrypting data 122. This optional step is preferred as it ensures data privacy but is not necessarily required for the maintenance of user privacy.

Figure 3:
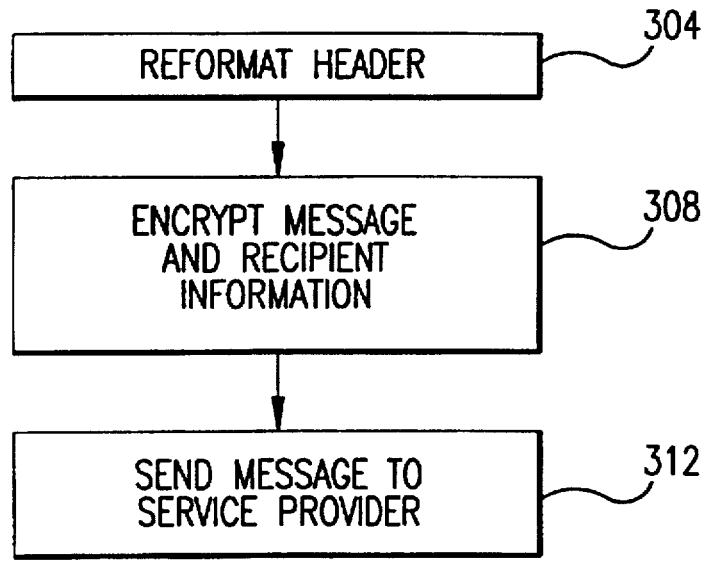
FIG. 3 is an operational flow diagram illustrating a process according to one embodiment of the invention for sending a message to a service provider for delivery to the intended recipient.
Figure 4:
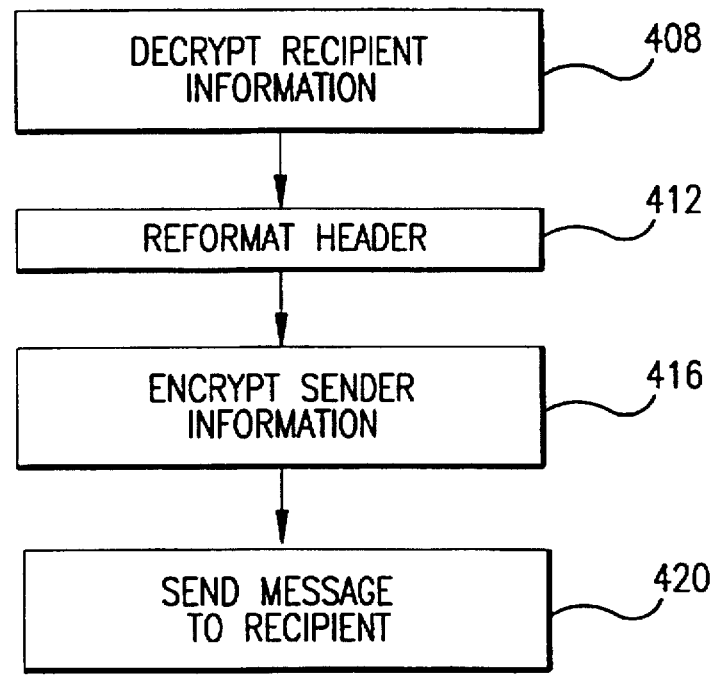
FIG. 4 is an operation flow diagram illustrating a process followed by the service provider according to one embodiment of the invention.
Figure 5:
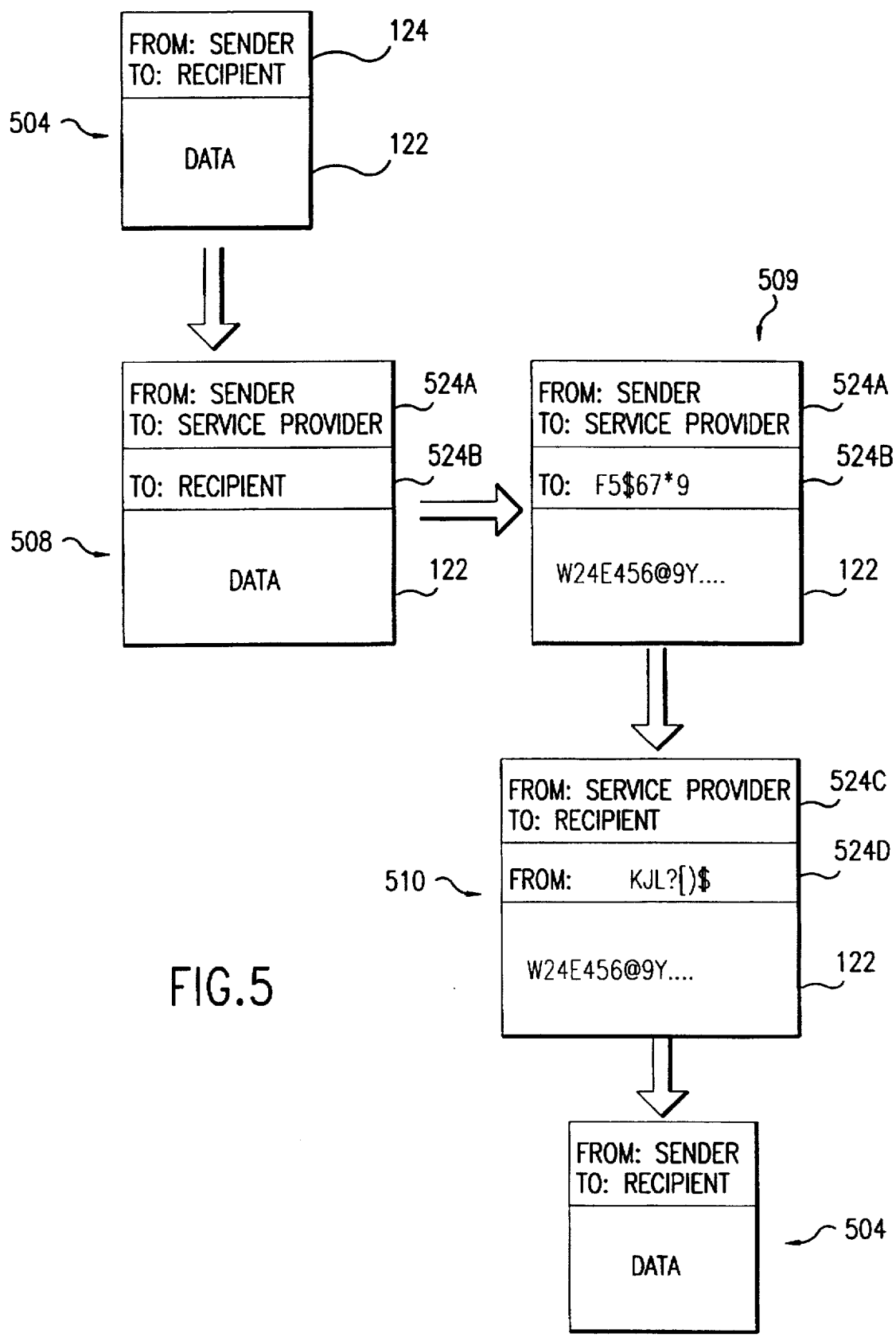
FIG. 5 is a diagram illustrating message structure according to one embodiment of the invention.

Having thus generally described the operation of one embodiment of the invention, the invention is now described in greater detail with reference to FIGS. 3 through 5. FIG. 3 is an operational flow diagram illustrating the process of preparing the message for shipment to service provider 108 according to one embodiment of the invention. FIG. 4 is an operational flow diagram illustrating the process of preparing the message for subsequent shipment to recipient 112 according to one embodiment of the invention. FIG. 5 is a block diagram illustrating message structure in greater detail according to one embodiment of the invention.

According to one embodiment of the invention, the process operates on a message 116 having a header 124 and data 122. Header 124 can include message attributes such as a sender identification (i.e., the "from" portion of the message), a recipient identification (i.e., the "to" portion of the message), and other administrative or housekeeping information. Data 122 is simply the text, graphics, or other information that makes up the contents of message 116. In a step 304, header 124 of message 116 is reformatted. The primary purpose of this reformatting step is to include an interim address to which the message is to be delivered. Specifically, according to one embodiment, this interim address is the address of service provider 108 which is to handle the message. Thus, according to one embodiment, as a result of this step the interim address is now in the "TO" portion of the header. The reformatted message is illustrated in FIG. 5 as message 508. As the result of a formatting, message 508 includes a first header 524(a) having sender and interim recipient information, a second header 524(b) having the original recipient information and data 122.

In a step 308, parts of the message 116 are encrypted. Specifically, recipient information 524(b) is encrypted to maintain privacy of this information Additionally, data 122 may be encrypted as well. The resultant message 116 is illustrated as message 509 in FIG. 5 where recipient information 524(b) and data 122 are encrypted. Note that the encryption of data 122 is optional as it is not necessarily required to maintain the privacy of users 104, 112. Further note that the encryption of data 122 need not be performed in conjunction with the encryption of recipient information 524(b), but can be performed in a different process step and can be performed using a different encryption key.

In a step 312, message 509 is sent to service provider 108.

In a step 408, service provider 108 receives message 509 and decrypts the encrypted information. In one embodiment, service provider 108 only decrypts encrypted recipient information 524(b). It is not necessary that service provider 108 decrypt data 122 as the contents of data 122 need not be known by service provider 108. As such, it is not necessary that service provider 108 have the key needed to decrypt data 122.

In a step 412, service provider 108 reformats the header to reflect that the message is being sent from service provider 108 to recipient 112. This is illustrated by the reference characters 524(c), 524(d) for message 510. In a step 416, the identification of the original sender 104 is encrypted so that this information cannot be gleaned by a third party. In a step 420, message 510 is sent to recipient 112. Upon receipt, recipient 112 decrypts sender information 524(d) and data 122 resulting in original message 504. Original message 504 can now be read by recipient 112.

As a result of these process steps, without an encryption key a third party is unable to detect the sending of messages 116 between a sender 104 and a recipient 112. Because the actual recipient information is encrypted while the message is sent from sender 104 to service provider 108 via link 164, anyone intercepting that message 116 may know the identity of sender 104 (or at least 104's IP address) but will not be able to determine who the recipient is. Similarly, when the message is sent from service provider 108 to recipient 112 via link 168, a third party intercepting the message may know the identity of recipient 112, but will not know the identity of the original sender 104. Thus, the end-to-end privacy of users 104, 112 is protected.

Note that where link 164 is a direct link to service provider 108, as opposed to a network connection or an open network connection, it may not be necessary to encrypt recipient information. In other words, where sender 104 has a direct link with service provider 108, or is otherwise confident of the security of the link between himself and service provider 108, it is not necessary to perform the process steps illustrated in FIG. 3. An example of where the scenario may occur is where sender 104 may have a direct dial-in line to service provider 108.

Note that as discussed above, it is not necessary that service provider 108 decrypt data 122 where data 122 is encrypted. Thus, in the end-to-end scenario, it is not necessary that service provider 108 have the key needed to encrypt/decrypt data 122. This key can be maintained by end users 104, 112. In this scenario, it may be desirable to have a second key for the encryption and decryption of the header information. This second key can be maintained by users 104, 112 as well as by service provider 108. Service provider 108 uses this key to encrypt and decrypt the header information.

Numerous encryption and decryption techniques are well known and it is not important which of these techniques is used to encrypt/decrypt the header information according to the invention. In one embodiment, SMARTCARD technology is used for the encryption and decryption of the header information. SMARTCARD encryption/decryption devices are well known and are readily available through commercial vendors such as GEMPLUS, Gaithersburg, Md.

Figure 6:
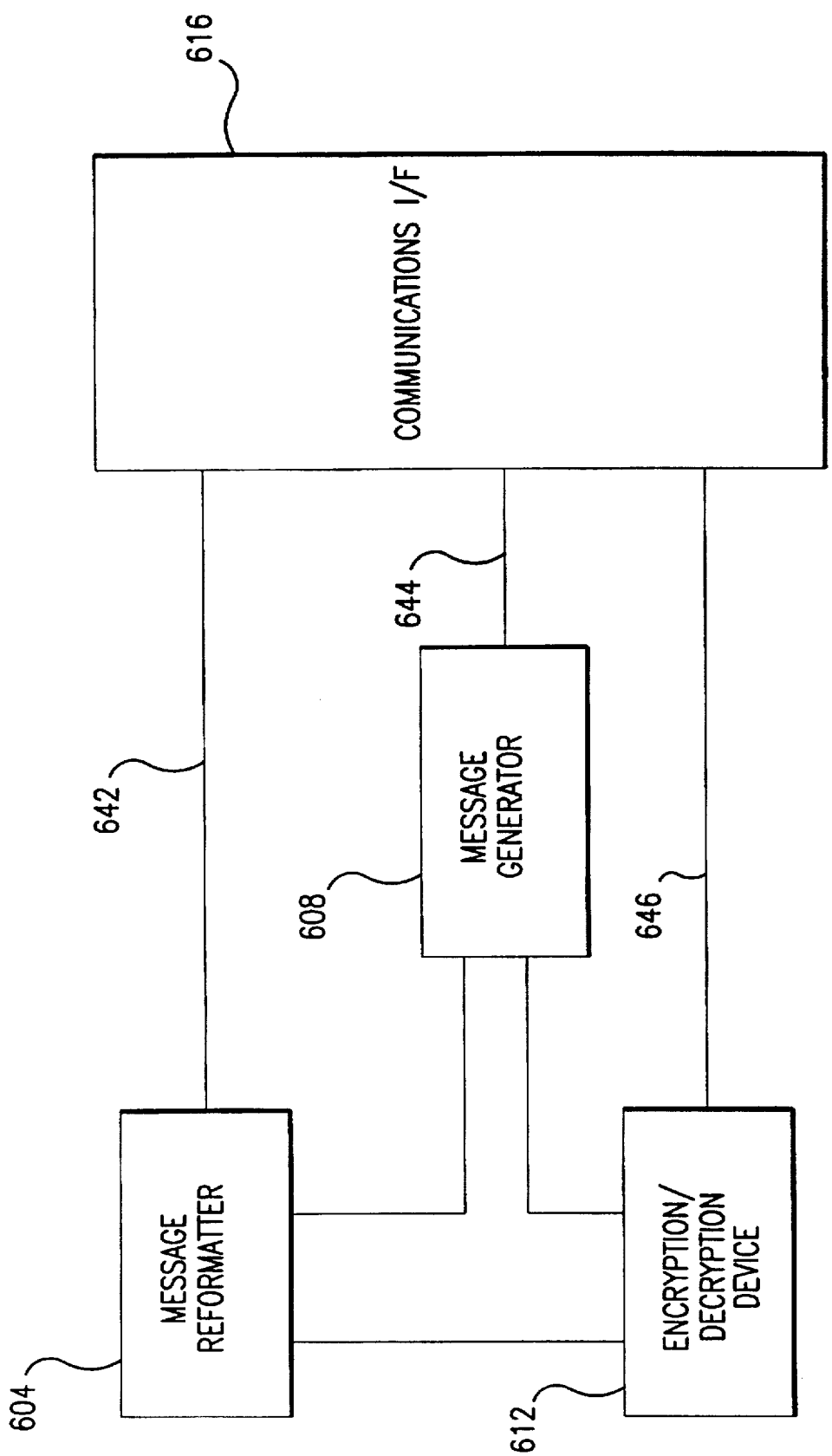
FIG. 6 is a block diagram illustrating a representative functional architecture according to one embodiment of the invention.

FIG. 6 is a block diagram illustrating an example architecture which may be used to implement the present invention. This example architecture 600 includes a message reformatter 604, a message generator 608, an encryption/decryption device 612, and a communications interface 616. Message reformatter 604 examines the header information 124 of the message 116 and reconstructs the new header needed to send message 116 to the next recipient (i.e., to interim recipient service provider 108, or to final recipient 112). Message reformatter also can be used to insert interim sender information where service provider 108 is sending the message to recipient 112. Note that it is not important what particular physical architecture is used to implement the invention as long as the necessary functionality is provided.

This functionality can be implemented in end users 104, 112 as well as in service provider 108. Note that while both end users 104,112 and service provider 108 need encryption and decryption capabilities, it is not necessary that service provider 108 have a message generator 608.

Encryption/decryption device 612 performs the encryption/decryption of header information 124. Encryption/decryption device 612 can also be used to encrypt and decrypt data 122. This is especially desirable to avoid the need to duplicate this function at both sender 104 and recipient 112. Message generator 608 generates the original message, including the header information indicating the original sender 104 and recipient 112. Communication interface 616 provides the communications capabilities necessary to transfer the message between users 104, 112, and service provider 108. Note that interfaces 642, 644, 646 are provided between each of message reformatter 604, message generator 608, and encryption/decryption device 612. This architecture was illustrated in this fashion to show how flexibility can be provided within the invention. For example, where security and privacy are not a concern, an unencrypted message can be sent directly from message generator 608 over the network via connection 644 and communications interface 616. Where encryption of a message is desired, encryption/decryption device 612 provides a message to communications interface 616 via connection 646. This message can be a reformatted message with encrypted header information according to the invention or, alternatively, a standard message where just data 122 is encrypted. Although connection 642 is illustrated, is doubtful that one would wish to send a reformatted message without encryption of the header information as this would serve little purpose.

The example architecture 600 illustrated in FIG. 6 is provided to illustrate the functionality required to implement the present invention according to one embodiment. This and equivalent architectures can be implemented using hardware components, software, or a hybrid combination of both hardware and software. According to one embodiment, the invention is implemented in a personal computer or work station. Note that in one embodiment, message generator 608 is implemented a readily available, off-the-shelf, electronic mail software package, message reformatter is software written to reformat the message as described herein, and encryption/decryption device 612 is implemented using a SMARTCARD plugged into the computer.

4. Software Embodiments

Figure 7:
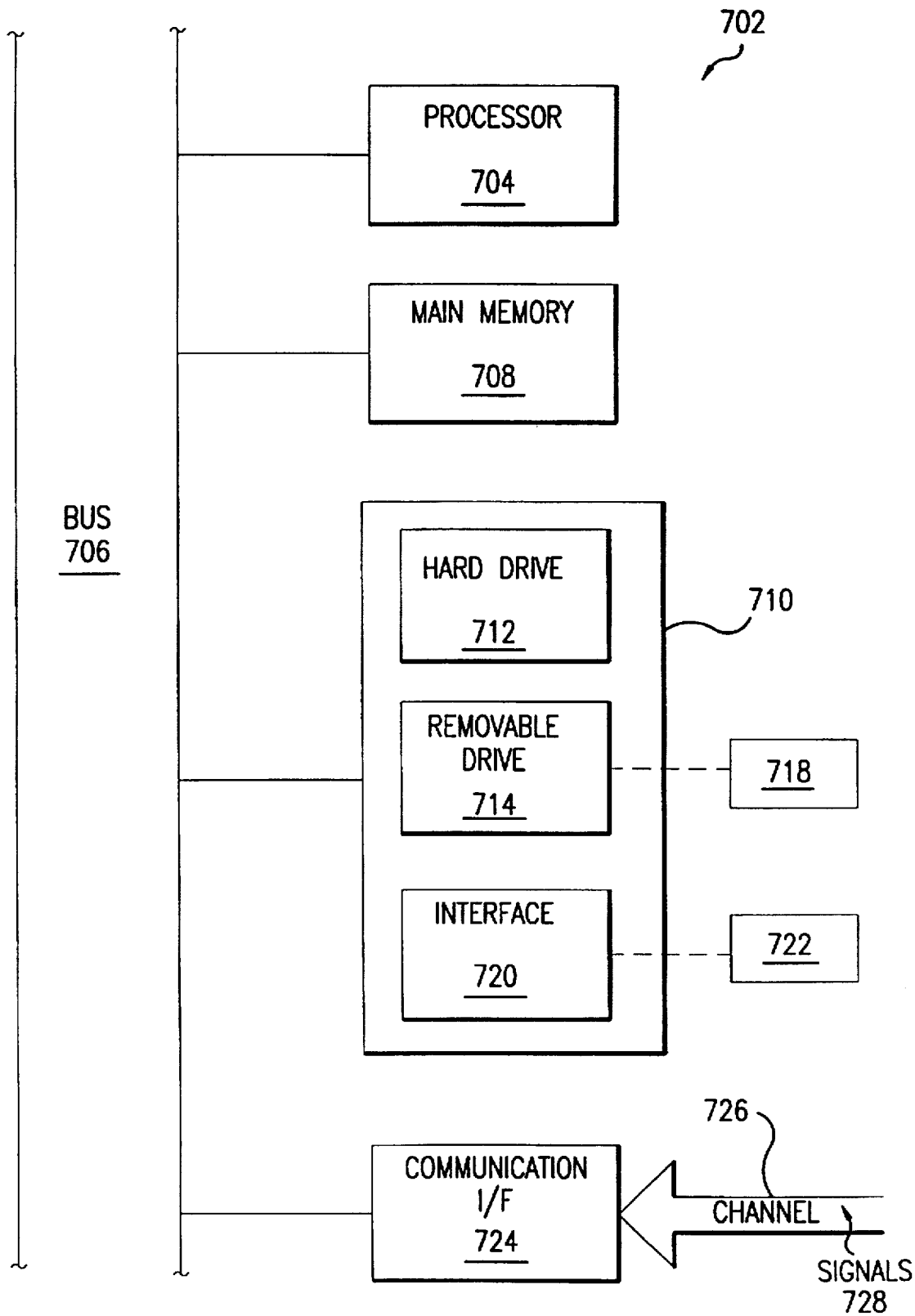
FIG. 7 is a diagram illustrating an example computer system in which the invention can be implemented according to one embodiment of the invention.

As stated above, the invention may be implemented using hardware, software or a combination thereof and may be implemented in a computer system or other processing system. In fact, in one embodiment, the invention is directed toward a computer system capable of carrying out the functionality described herein. An example computer system 702 is shown in FIG. 7. The computer system 702 includes one or more processors, such as processor 704. The processor 704 is connected to a communication bus 706. Various software embodiments are described in terms of this example computer system. After reading this description, it will become apparent to a person skilled in the relevant art how to implement the invention using other computer systems and/or computer architectures.

Computer system 702 also includes a main memory 708, preferably random access memory (RAM), and can also include a secondary memory 710. The secondary memory 710 can include, for example, a hard disk drive 712 and/or a removable storage drive 714, representing a floppy disk drive, a magnetic tape drive, an optical disk drive, etc. The removable storage drive 714 reads from and/or writes to a removable storage unit 718 in a well known manner. Removable storage unit 718, represents a floppy disk, magnetic tape, optical disk, etc. which is read by and written to by removable storage drive 714. As will be appreciated, the removable storage unit 718 includes a computer usable storage medium having stored therein computer software and/or data.

In alternative embodiments, secondary memory 710 may include other similar means for allowing computer programs or other instructions to be loaded into computer system 702. Such means can include, for example, a removable storage unit 722 and an interface 720. Examples of such can include a program cartridge and cartridge interface (such as that found in video game devices), a removable memory chip (such as an EPROM, or PROM) and associated socket, and other removable storage units 722 and interfaces 720 which allow software and data to be transferred from the removable storage unit 718 to computer system 702.

Computer system 702 can also include a communications interface 724. Communications interface 724 allows software and data to be transferred between computer system 702 and external devices. Examples of communications interface 724 can include a modem, a network interface (such as an Ethernet card), a communications port, a PCM-CIA slot and card, etc. Software and data transferred via communications interface 724 are in the form of signals 728 which can be electronic, electromagnetic, optical or other signals 728 capable of being received by communications interface 724. These signals 728 are provided to communications interface via a channel 726. This channel carries signals 728 and can be implemented using wire or cable, fiber optics, a phone line, a cellular phone link, an RF link and other communications channels.

In this document, the terms "computer program medium" and "computer usable medium" are used to generally refer to media such as removable storage device 718, a hard disk installed in hard disk drive 712, and signals 728. These computer program products are means for providing software to computer system 702.

Computer programs (also called computer control logic) are stored in main memory and/or secondary memory 710. Computer programs can also be received via communications interface 724. Such computer programs, when executed, enable the computer system 702 to perform the features of the present invention as discussed herein. In particular, the computer programs, when executed, enable the processor 704 to perform the features of the present invention. Accordingly, such computer programs represent controllers of the computer system 702.

In an embodiment where the invention is implement using software, the software may be stored in a computer program product and loaded into computer system 702 using removable storage drive 714, hard drive 712 or communications interface 724. The control logic (software), when executed by the processor 704, causes the processor 704 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s).

In yet another embodiment, the invention is implemented using a combination of both hardware and software. In one example of this embodiment, encryption/decryption device 612 may be implemented using a SMARTCARD while the remaining functionality is implemented using software.

5. Conclusion

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

I claim:

1. A method for ensuring user privacy in network communications where a message is sent from a first user to a second user via a service provider, the message comprising a first and second portion, said first portion indicating an identification of the first user as the sender of the message and said second portion indicating the second user as the recipient of the message, the method comprising the steps of:

reformatting the message such that the message identifies the service provider as the recipient of the message;

encrypting said second portion of the message that identifies the second user as the recipient of the message and sending the message to the service provider;

the service provider decrypting said second portion of the message that identifies the second user as the recipient and reformatting delivery information to indicate the service provider as the sender of the message from the service provider to the second user; and encrypting a third portion of said delivery information that identifies the first user as the sender and sending the message to the second user;

wherein said step of reformatting the message comprises the step of replacing said second portion of said header with a third portion, wherein said third portion identifies the service provider as the recipient of the message.

2. The method according to claim 1, further comprising the step of the second user decrypting said third portion of said delivery information.

3. The method of claim 1, further comprising the step of encrypting a data portion of the message before sending the message to the service provider.

4. The method of claim 1, wherein said step of reformatting the message comprises the step of modifying a "TO" designation in a header of the message to reflect the service provider as the recipient of the message.

5. The method of claim 1, wherein said step of the service provider reformatting delivery information comprises the steps of:

modifying a "TO" designation in a header of the message to reflect the second user as the recipient of the message; and modifying a "FROM" designation in a header of the message to reflect that it is the service provider which is sending the message to the second user.

6. A method for ensuring user privacy in network communications, where a message is sent from a first user to a second user, the method comprising the steps of:

receiving at a service provider a message from the first user, wherein the message comprises an identification of the service provider as the recipient and wherein an identification of the second user is encrypted;

decrypting the identification of the second user;

reformatting the message to identify the second user as the recipient;

encrypting the identification of the first user; and sending the reformatted message to the second user.

7. The method according to claim 6, wherein said step of reformatting the message to identify the second user as the recipient comprises the steps of:

modifying a "TO" designation in the message to reflect the second user as the recipient of the message; and modifying a "FROM" designation in the message to reflect that it is the service provider which is sending the message to the second user.

8. A method for ensuring user privacy in network communications, where a message is sent from a first user to a second user, the message comprising a first and second portion, said first portion indicating an identification of the first user as the sender of the message and said second portion indicating the second user as the recipient of the message, the method comprising the steps of:

reformatting a message such that the message identifies the service provider as the recipient of the message;

encrypting said second portion of the message that identifies the second user as the recipient of the message; and sending the message to the service provider for subsequent delivery to the user;

wherein said reformatting step further comprises the step of reformatting the message to identify the service provider as the sender.

9. The method according to claim 8, further comprising the steps of:

receiving a second message from the service provider, wherein the second message has been reformatted by the service provider to encrypt the identification of the first user as the sender; and decrypting said encrypted identification of the first user to determine the sender of the second message.

10. The method of claim 8, wherein said step of reformatting the message comprises the step of modifying a "TO" designation in a header of the message to reflect the service provider as the recipient of the message.

11. A computer program product for use with a computer system, said computer program product comprising:

a computer usable medium having computer readable program code means embodied in said medium for causing the computer system to ensure user privacy in network communications, where a message is sent from a first user to a second user, said computer readable program code means comprising:

computer readable program code means for causing the computer system to receive at a service provider a message from the first user, wherein the message comprises an identification of the service provider as the recipient and wherein an identification of the second user is encrypted;

computer readable program code means for causing the computer system to decrypt the identification of the second user;

computer readable program code means for causing the computer system to reformat the message to identify the second user as the recipient;

computer readable program code means for causing the computer system to encrypt the identification of the first user; and computer readable program code means for causing the computer system to send the reformatted message to the second user;

wherein said computer readable program code means for causing the computer system to reformat further comprises computer readable program code means for reformatting the message to identify the service provider as the sender.

12. The computer program product according to claim 11, wherein said computer readable program code means for reformatting the message to identify the second user as the recipient comprises:

computer readable program code means for causing the computer system to modify a "TO" designation in the message to reflect the second user as the recipient of the message; and computer readable program code means for causing the computer system to modify a "FROM" designation in the message to reflect that it is the service provider which is sending the message to the second user.

13. A computer program product for use with a computer system, said computer program product comprising:

a computer usable medium having computer readable program code means embodied in said medium for causing the computer system to ensure user privacy in network communications, where a message is sent from a first user to a second user, the message comprising a first and second portion, said first portion indicating an identification of the first user as the sender of the message and said second portion indicating the second user as the recipient of the message, said computer readable program code means comprising:

computer readable program code means for causing the computer system to reformat a message such that the message identifies the service provider as the recipient of the message;

computer readable program code means for causing the computer system to encrypt said second portion of the message that identifies the second user as the recipient of the message;

computer readable program code means for causing the computer system to send the message to the service provider for subsequent delivery to the users;

computer readable program code means for causing the computer system to receive a second message from the service provider, wherein the second message has been reformatted by the service provider to encrypt the identification of the first user as the sender; and computer readable program code means for causing the computer system to decrypt said encrypted identification of the first user to determine the sender of the second message.

14. The computer program product according to claim 13, wherein said computer readable program code means for causing the computer system to reformat the message comprises computer readable program code means for causing the computer system to modify a "TO" designation in a header of the message to reflect the service provider as the recipient of the message.

15. A computer program medium readable by a machine, tangibly embodying a program of instructions executable by the machine to perform method steps for ensuring user privacy in network communications, where a message is sent from a first user to a second user, said method steps comprising the steps of:

- receiving at a service provider a message from the first user, wherein the message comprises an identification of the service provider as the recipient and wherein an identification of the second user is encrypted;
- causing the identification of the second user to be decrypted;
- reformatting the message to identify the second user as the recipient;
- causing the identification of the first user to be encrypted; and
- causing the reformatted message to be sent to the second user;
- wherein said step of reformatting further comprises a step of reformatting the message to identify the service provider as the sender.

16. The computer program medium according to claim 15, wherein said step of reformatting the message to identify the second user as the recipient comprises the steps of:

- modifying a "TO" designation in the message to reflect the second user as the recipient of the message; and
- modifying a "FROM" designation in the message to reflect that it is the service provider which is sending the message to the second user.

17. A computer program medium readable by a machine, tangibly embodying a program of instructions executable by the machine to perform method steps for ensuring user privacy in network communications, where a message is sent from a first user to a second user, the message comprising a first and second portion, said first portion indicating an identification of the first user as the sender of the message and said second portion indicating the second user as the recipient of the message, said method steps comprising the steps of:

- reformatting a message such that the message identifies the service provider as the recipient of the message;
- encrypting said second portion of the message that identifies the second user as the recipient of the message;
- sending the message to the service provider for subsequent delivery to the user;
- receiving a second message from the service provider wherein the second message has been reformatted by the service provider to encrypt the identification of the first user as the sender; and
- decrypting said encrypted identification of the first user to determine the sender of the second message.

18. The computer program medium according to claim 17, wherein said step of reformatting the message comprises a step of modifying a "TO" designation in a header of the message to reflect the service provider as the recipient of the message.

* * * * *